April 21, 1942.    G. H. FRITZINGER    2,280,575
PHONOGRAPH
Filed Feb. 18, 1939    4 Sheets-Sheet 1
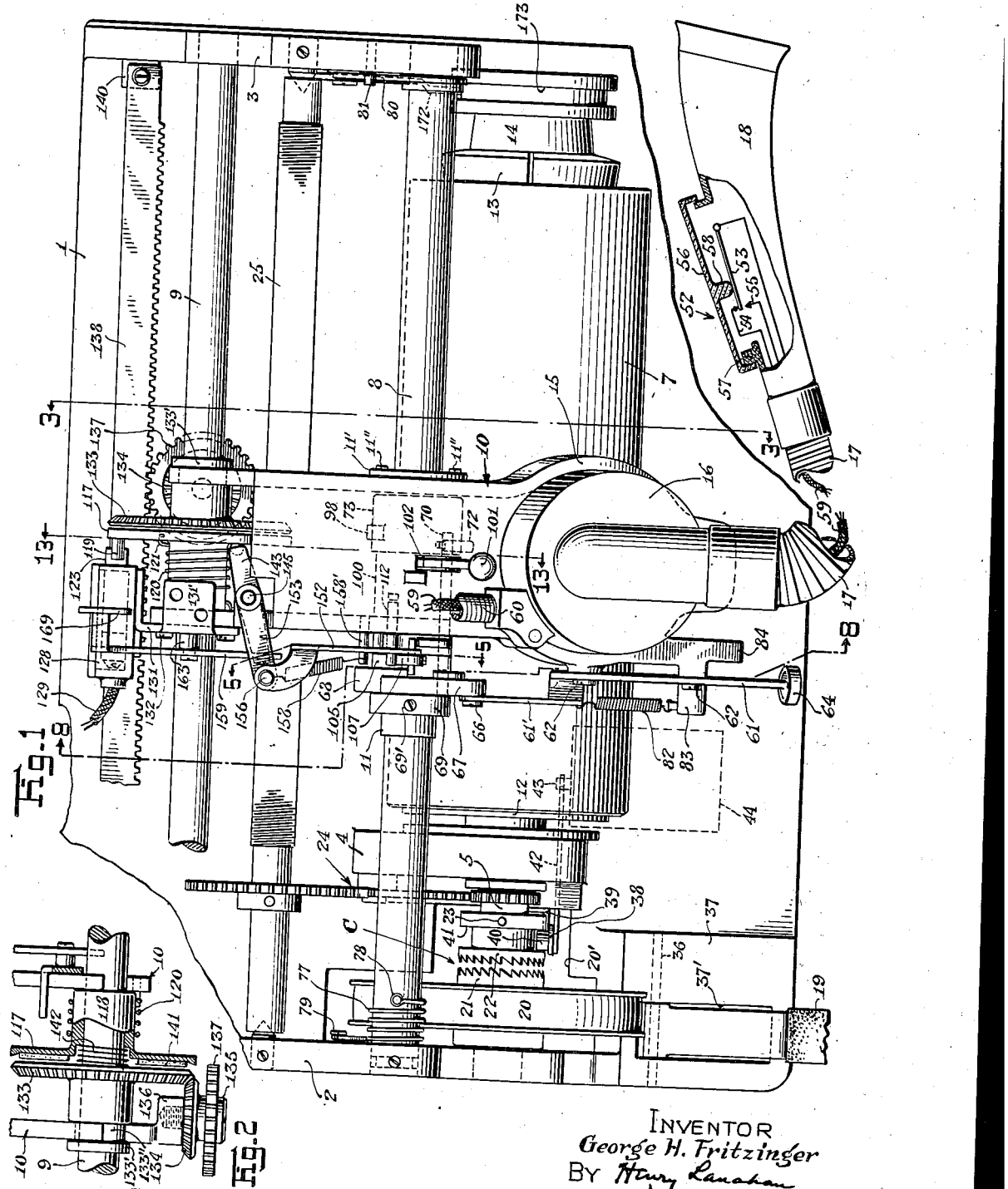
INVENTOR
George H. Fritzinger
BY Henry Lanahan
ATTORNEY

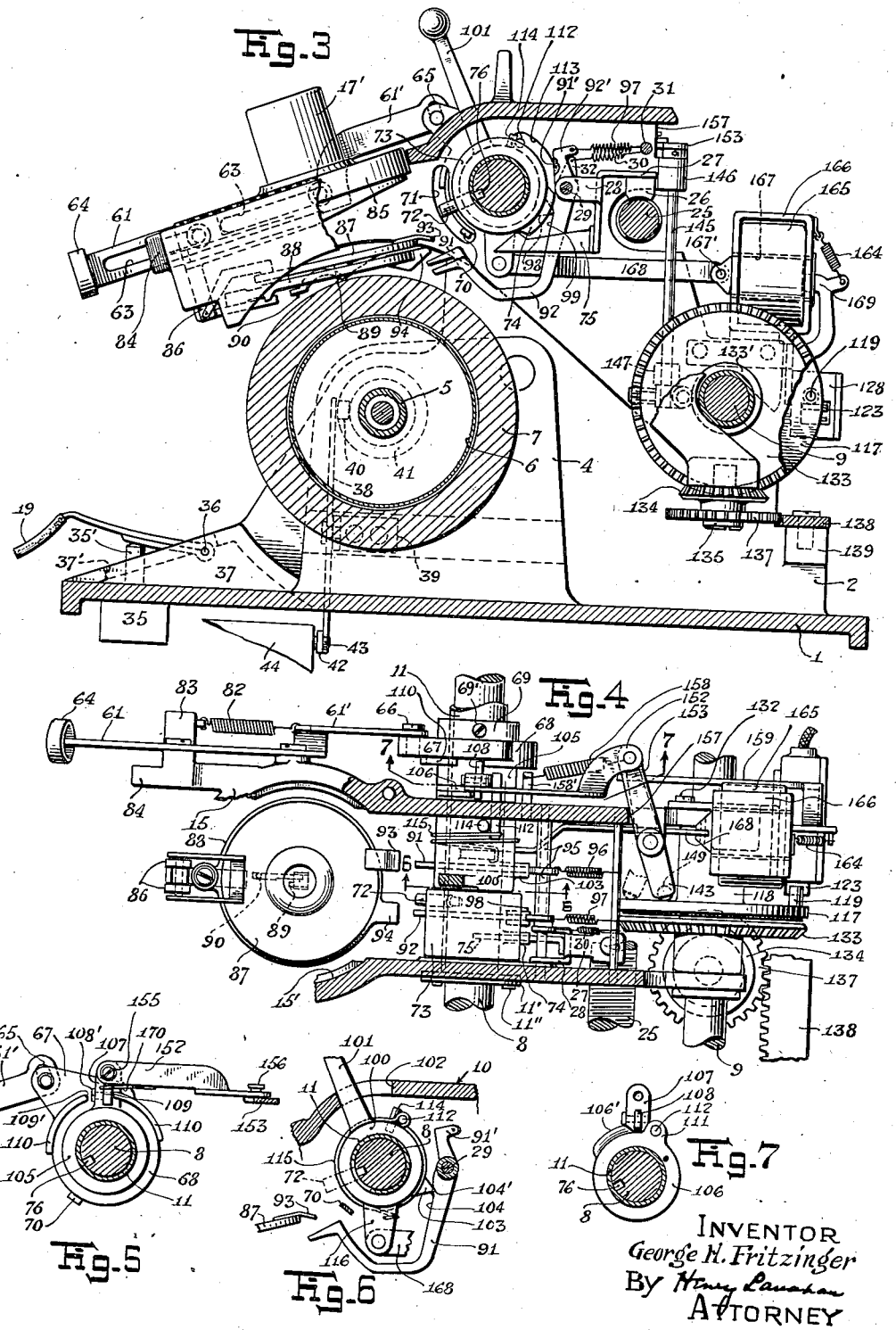

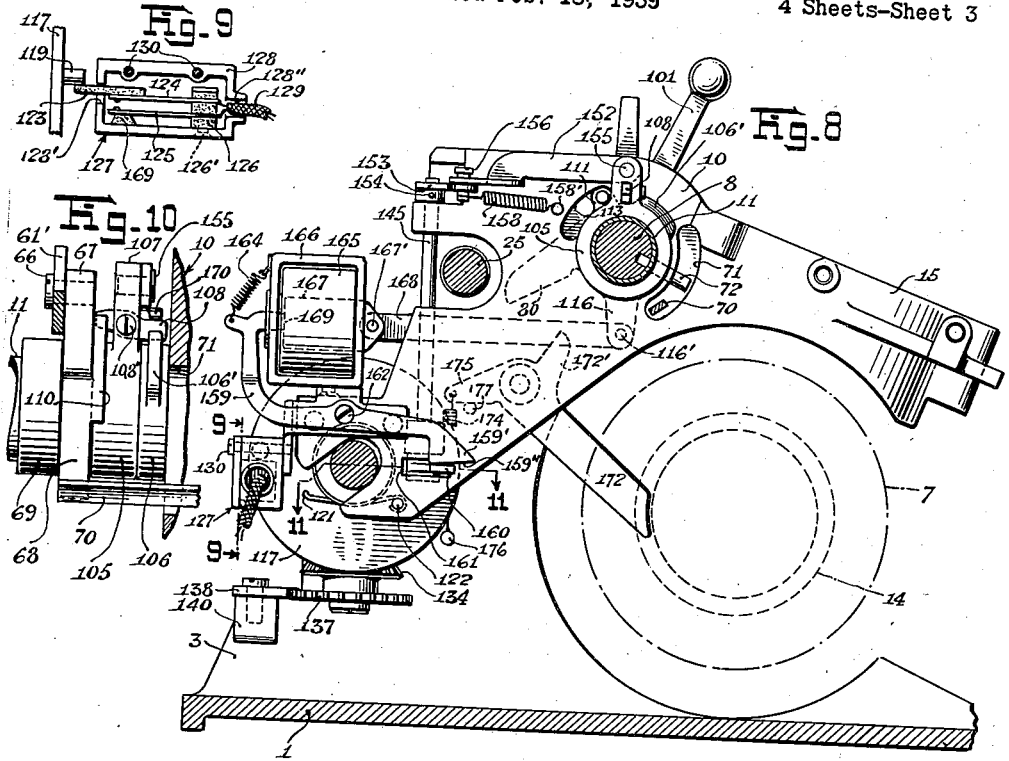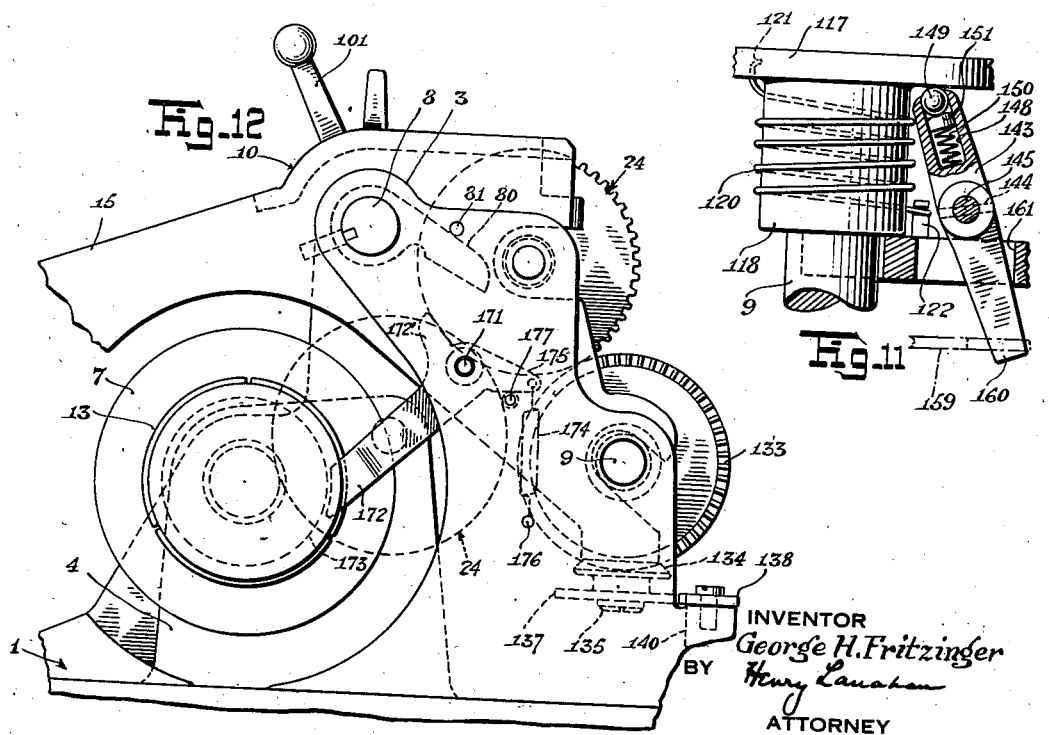

April 21, 1942.　　　　G. H. FRITZINGER　　　　2,280,575
PHONOGRAPH
Filed Feb. 18, 1939　　　4 Sheets-Sheet 4
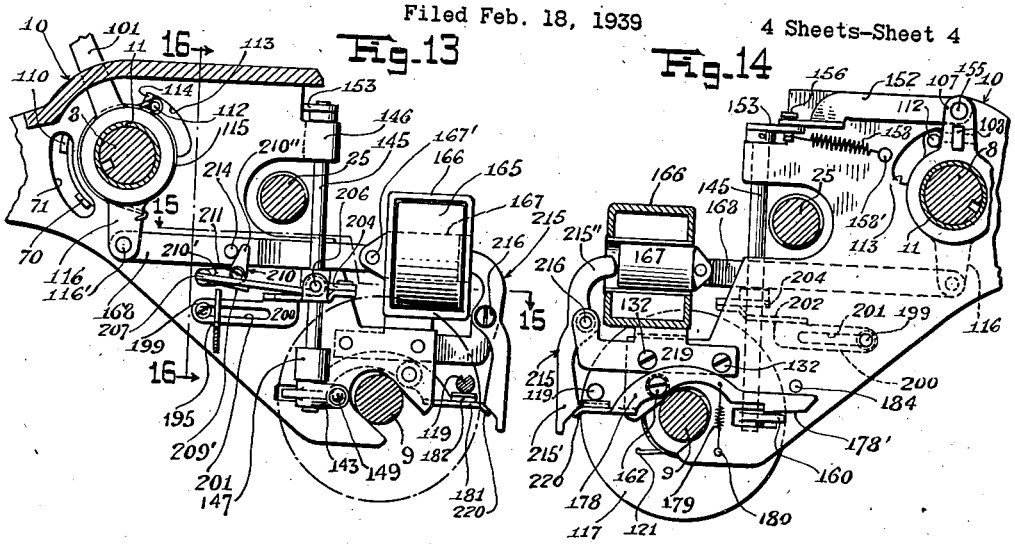
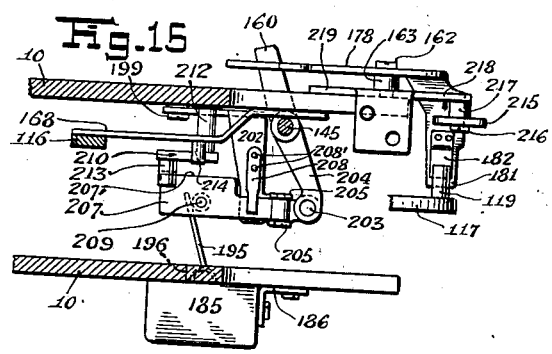
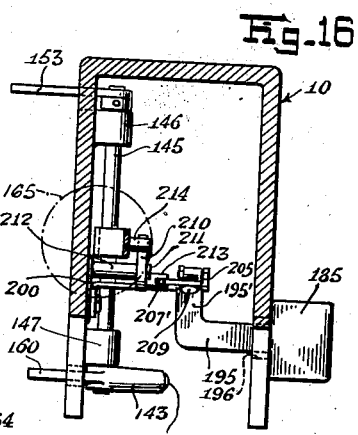
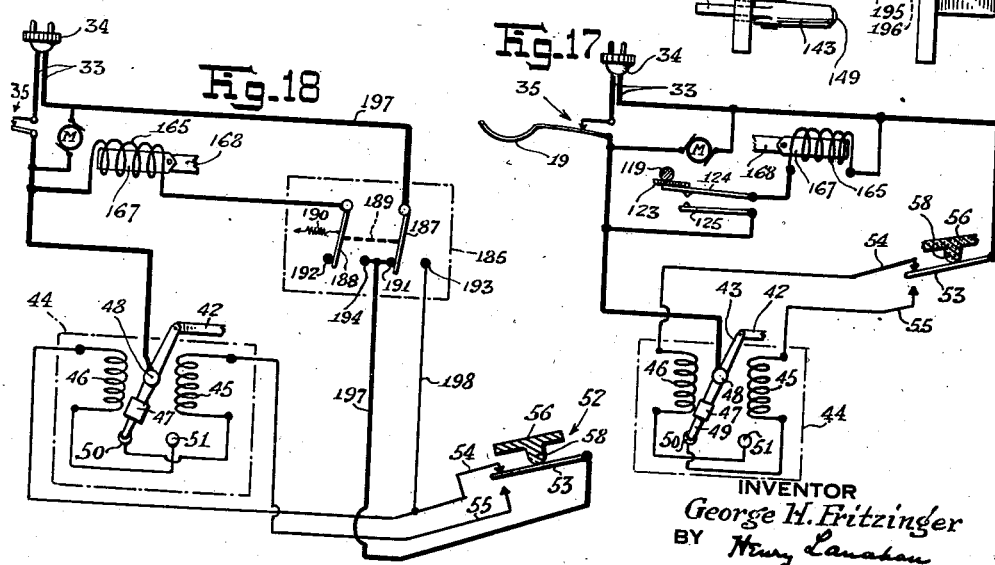
INVENTOR
George H. Fritzinger
BY Henry Lanahan
ATTORNEY Patented Apr. 21, 1942

2,280,575

UNITED STATES PATENT OFFICE 2,280,575

PHONOGRAPH

George H. Fritzinger, Orange, N. J., assignor to Thomas A. Edison, Incorporated, West Orange, N. J., a corporation of New Jersey Application February 18, 1939, Serial No. 257,069

36 Claims. (Cl. 274—17)

This invention relates to phonographs, and more particularly to phonographs which are selectively conditionable for recording and reproducing. The invention is especially concerned with the provision of novel and improved means for facilitating the use of a recording and reproducing phonograph, and is distinctly adapted to enable the operator, while in the process of recording, to reproduce or listen back on previously recorded matter, and thereafter to resume recording, with a high degree of facility. While the invention has particular utility, and is shown and described, in connection with a commercial phonograph or dictating machine, no unnecessary limitation thereto is intended.

During the process of recording dictation the operator often finds need to reproduce, or listen back on, previously recorded matter in order to revive or reconstruct in his mind the run of his thoughts. It is obviously important that the operator be able to reproduce such previously recorded matter with a minimum of distraction. To this end a dictating machine may well be rendered partially automatic so as to reduce the number of manipulations required in the selective reproduction of previously recorded matter and the subsequent resumption of recording. For example, when the sound translating device is backspaced and placed in condition for reproducing, and the selected previously recorded matter is then reproduced, the translating device may be later automatically conditioned for recording to permit the operator to proceed immediately with a further recording of dictation. Instead of, or in addition to, the automatic action of reconditioning the sound translating device for recording, other automatic actions may be desired such, for example, as a stopping of the machine or a change in the indication of a signalling means. However, regardless of the particular automatic action to be obtained, there is required some means for controlling the time at which the action will occur, this time usually being when the translating device is advanced, subsequent to a backspacing thereof, to the point from which it was backspaced or to a predetermined distance therefrom. To so control such automatic actions there has been employed an advance device which is normally moved in a predetermined manner only when the translating device is advanced, the advance device remaining in its moved position when the translating device is backspaced. Such an advance device defines the position of farthest advance reached by the translating device prior to a backspacing thereof, and from another view point it defines the distance of backspacing of the translating device from a position of farthest advance of the device.

A difficulty with an advance device of the abovementioned type lies in restoring, or getting back, the device to its initial position when once it is moved therefrom by the translating device. The provision of means for insuring the proper restoration of the advance device encumbers the operation of the machine and adds materially to the complexity of its mechanism.

It is an object of my invention to provide new, improved and simplified means for performing the functions of the above mentioned type of advance device, and for controlling the same.

It is another object of my invention to provide new and improved means for defining the distance of spacing of the translating device from any selected position of the device in its path.

It is another object of my invention to provide improved means in a recording and reproducing phonograph for enabling the operator to reproduce or listen back on previously recorded matter, and thereafter to resume recording, with a minimum of distraction and yet without otherwise encumbering the operation and/or control of the machine.

It is another object of my invention to provide a means for defining the distance of backspacing of the translating device from any selected position of the device in its path, which means is so controlled as to be operative only when called upon to perform a useful function.

It is a further object of my invention to provide means for placing the above mentioned defining means in operative and inoperative conditions, at will.

It is a further object of my invention to restore the defining means to neutral or initial position as an incident of placing the same in inoperative condition.

Another object of my invention is to control the defining means so as to place the same in operative condition incidental to a conditioning of the sound translating device for reproducing, and to automatically place the defining means in inoperative condition and to restore the same when it has completed its intended function.

Another object of my invention is to place the defining means in inoperative condition and to automatically restore the same as an incident to the completion of the performance of its function.

Another object of my invention is to provide improved and simplified means controllable to limit the distance through which the translating device may be manually moved.

Another object of my invention is to provide a recording and reproducing phonograph which is readily controllable to perform all functions relating to the recordation and reproduction of dictation, or the like.

Another object is to provide means, operable at will, for distinguishing between any selected position of the translating device in its path and a position of the device spaced therefrom.

It is a still further object of my invention to provide improved and simplified means for performing automatic operations in the use of the machine when the sound translating device, subsequent to a backspacing thereof, is advanced to a predetermined position relative to the position from which it was backspaced.

Other and allied objects will more fully appear from the following description and the appended claims.

In the description of my invention reference is had to the accompanying drawings, of which:

Figure 1 is a top plan view of a recording and reproducing phonograph incorporating one embodiment of my invention;

Figure 2 is a rear elevational view, partly in section, of a portion of the mechanism of Figure 1, showing details of the defining means of the machine;

Figure 3 is a right-hand vertical cross-sectional view, taken substantially along the line 3—3 of Figure 1, a portion of the carriage for the sound translating device being broken away to better illustrate parts carried by the carriage;

Figure 4 is a fractional top plan view, partly in section, of the mechanism of Figure 3;

Figure 5 is a partial vertical cross-sectional view taken substantially along the line 5—5 of Figure 1;

Figure 6 is a partial vertical cross-sectional view taken substantially along the line 6—6 of Figure 4;

Figure 7 is a partial vertical cross-sectional view taken substantially along the line 7—7 of Figure 4;

Figure 8 is a left-hand vertical cross-sectional view taken substantially along the line 8—8 of Figure 1;

Figure 9 is a partial vertical cross-sectional view taken substantially along the line 9—9 of Figure 8;

Figure 10 is an enlarged fractional view, principally in front elevation but partly in section, showing details of the control means of the machine;

Figure 11 is an enlarged view partly in plan and partly in horizontal cross-section on line 11—11 of Figure 8, showing details of the defining means;

Figure 12 is a right-hand side elevational view of a portion of the mechanism of Figure 1;

Figure 13 is a vertical cross-sectional view taken substantially through the carriage along the line 13—13 of Figure 1, but showing mechanism within the carriage in accordance with a second embodiment of my invention;

Figure 14 is a partial vertical cross-sectional view, generally similar to Figure 8, but showing mechanism in accordance with the second embodiment of my invention;

Figure 15 is a partial cross-sectional view taken substantially along the line 15—15 of Figure 13;

Figure 16 is a partial cross-sectional view taken substantially along the line 16—16 of Figure 13;

Figure 17 is a diagrammatic view of mechanism and circuits in accordance with the first embodiment of my invention; and Figure 18 is a diagrammatic view of mechanism and circuits in accordance with the second embodiment of my invention.

Reference being had to the figures, particularly to Figures 1 and 3, there will be seen a recording and reproducing phonograph of the dictating-machine type incorporating one embodiment of my invention. This machine comprises a base plate 1 having left and right upright standards 2 and 3 and an intermediate upright standard 4. In the intermediate standard there is journalled a shaft 5 carrying a mandrel 6 for supporting a cylindrical record 7. The standards 2 and 3 support front and back longitudinal rods 8 and 9 on which a carriage 10 is slidably mounted for movement along the mandrel. The carriage 10 is provided with a sleeve 11 embracing the rod 8 and having a flange 11' secured to the carriage by the screws 11''. The carriage is also provided with a forwardly extending arm 15 which overlies the mandrel 6. In the arm 15 there is a shouldered opening 15' forming a seat for a sound translating device 16 of a type selectively conditionable for recording and reproducing. The translating device has an upwardly extending tube 17' (see Figure 3) to which is coupled a flexible speaking tube 17 carrying at its outer end a handpiece 18 usable as a mouthpiece during recording and as an earpiece during reproducing. Extending forwardly from the forward left-hand portion of the base plate 1 is a support 19, curved to fit the handpiece 18, for holding the handpiece during the non-use of the machine.

The mandrel 6 is preferably provided with a record holding and ejecting mechanism of the type disclosed in Gramann Patent No. 2,010,717, issued August 6, 1935, and entitled "Phonograph." This mechanism may be sufficiently described in the present instance as follows: A slidably mounted disk member 12 is provided at the left end of the mandrel and is biased rightwardly to abut against the left end of the record. At the open end of the mandrel there is provided an expansible and contractible chuck 13 which is rendered free to expand when the disk member 12 is moved leftwardly as by the mounting of a record on the mandrel. Such expansion of the chuck 13 causes the record to be held in a mounted position on the mandrel against the biasing of the disk member 12. To remove the record from the mandrel the chuck 13 is contracted by moving a handpiece 14, carried at the open end of the mandrel, in a leftward direction. Upon the contraction of the chuck 13 the record is ejected by the disk member 12, and the chuck 13 is then releasably locked in a contracted position as an incident to such ejection.

Geared to the mandrel shaft 5, by a train of gears 24 is a feed screw 25 for advancing the carriage along the mandrel—i. e., from left to right—coincidentally with a rotation of the mandrel. The feed screw 25 is rotatably supported by the standards 2 and 3, and is engaged by a feed nut 26 carried by a bracket 27 having left and right turned over lugs 28 which are pivoted on a cross rod 29 carried by the carriage, as shown in Figures 3 and 4. The feed nut 26 is normally held in engagement with the feed screw 25 by a tension spring 30 connected between a cross rod 31 on the carriage and an arm 32 extending upwardly from the left one of the lugs 28.

The mandrel shaft 5 may be rotatably connected with a drive pulley 20, which is rotatably supported by the standard 2 with its axis in line with the mandrel shaft, by means of a clutch mechanism C. This mechanism comprises a toothed clutch member 21 on the inner side of the pulley 20 and another similar toothed clutch member 22 which is splined to the shaft 5 by a pin and slot arrangement of which the pin appears as 23. The clutch member 22 is thus movable along the shaft 5 into and out of engagement with the clutch member 21 to connect the pulley 20 with the mandrel shaft 5 at will.

The drive pulley 20 may be driven by a motor M, represented diagrammatically in Figure 17, which may be mounted below the base plate 1 and be coupled to the pulley by a belt (not shown), the base plate 1 having an opening 20' through which the belt may pass. The motor M is serially connected in a power supply circuit 33 adapted to make connection with a suitable source of power by way of a plug 34. In the power supply circuit 33 is a switch 35, diagrammatically shown in Figures 3 and 17, which is selectively closeable and openable to start and stop the motor M. The switch 35 is usually controlled by the handpiece support 19 in a manner to cause the switch to be opened and closed when the handpiece 18 is respectively placed on and removed from its support. Reference being had to Figure 3, it will be seen that the handpiece support 19 is pivoted, by a pin 36, to a raised portion 37 of the base plate having an opening 37' from which the support 19 projects. In contact with the underside of the support 19 is a push button 35' of the switch 35 which is biased upwardly to urge the switch 35 into closed position and to urge the support 19 upwardly. When the handpiece 18 is placed on the support 19 the weight of the handpiece causes the support to be moved downwardly and the switch 35 to be moved, against its biasing, into open position. By this means the power supply to the phonograph is shut off to stop the motor M when the handpiece 18 is placed on its support 19, the power supply being restored to start the motor M when the handpiece is removed from its support.

During the use of the machine the handpiece 18 is held in the hand and the motor M is in continuous operation. Engagement of the clutch mechanism C then places the mandrel 6 and feed screw 25 in rotation, the rotation of the feed screw normally causing, as whenever the feed nut 26 is engaged therewith, a feeding of the carriage and sound translating device 16 along the mandrel, as from its leftward or initial position to its rightward or terminal position.

To operate the clutch mechanism C, there is provided a vertically disposed lever 38 pivotally supported by a bracket 39 (see Figures 1 and 3) secured to the intermediate standard 4. The lever 38 carries at its upper end portion a pin 40 which engages an annular groove 41 in the clutch member 22. The lower portion of the lever 38 extends downwardly through the opening 20' in the base plate 1, and is pivotally connected to a link 42 which in turn is pivotally connected to an operating arm 43 of a suitable clutch actuating mechanism 44 shown diagrammatically in Figure 1. This actuating mechanism may very desirably be in the form of an electromagnetic device such as is described in Langley Patent No. 1,380,486, issued June 7, 1921 and entitled "Controlling device."

An actuating mechanism of the form above mentioned is well known in the art and may be sufficiently illustrated in the present instance by its schematic showing in Figures 17 and 18. This mechanism comprises start and stop coils 45 and 46 selectively energizable to attract an armature 47 pivoted as at 48 and coupled by the aforementioned arm 43 to the link 42. When a circuit is established to cause current to flow through the start coil 45, the armature 47 is swung in the direction of that coil to cause the clutch C to be engaged. At the same time the circuit of the start coil 45 is broken and the circuit of the stop coil is prepared for operation by means of a single-pole double-throw switch comprising a pole member 49, controlled by the armature 47, and contact members 50 and 51 respectively serially connected in the circuits of the start and stop coils 45 and 46. When the stop coil 46 is next energized, the reverse operation takes place: the clutch C being disengaged, the circuit through the stop coil 46 being broken, and the circuit of the start coil 45 being again prepared for operation.

To control the clutch actuating mechanism 44 there is provided a hand switch 52 of the single-pole double-throw variety, which is commonly mounted on the handpiece 18 for ready manipulation during the use of the machine. The switch 52 comprises a pole member 53 and contact members 54 and 55, and is provided with a cover 56 pivoted to the handpiece as at 57 and having a boss 58 contacting the pole member 53. The pole member 53 is biased to normally make connection with the contact member 54 and to hold the cover 56 in an outward position, as is shown in Figure 1, this being the stop position of the hand switch. When the cover 56 is moved inwardly, as by the grasp of the hand, the pole member 53 makes contact with the contact member 55, this being the start position of the hand switch. The hand switch 52 is connected to the clutch actuating mechanism 44 by a three-wire cable 59 which extends within and along the speaking tube 17 and then onwardly within a flexible protective casing 60. This connection is schematically shown in Figure 17 and is such that the pole member 53 is connected to the power supply circuit 33 on the side opposite to that connected to the switch pole 49 of the actuating mechanism 44, the contact members 54 and 55 being connected respectively to the stop and start coils 46 and 45. Thus, when the cover 56 is moved inwardly into start position, the start coil 45 is energized to engage the clutch C, and when the cover 56 is released into stop position, the stop coil 46 is energized to disengage the clutch.

The carriage feeding means is operable only to advance the carriage at a slow steady rate of speed. Any other movement of the carriage required in the use of the machine such, for example, as a backspacing or returning of the carriage along its path is preferably manually performed. To manually move the carriage the feed nut 26 must be first disengaged from the feed screw 25. This may be done at will by means of a forwardly extending control member 61 slidably mounted on the left side of the carriage arm 15 by means of a pair of shoulder screws 62 which pass respectively through a pair of elongated slots 63 in the control member to thread into the carriage arm.

The control member 61 has a finger-piece 64 at its forward end adapted to facilitate the manipulation of the control member. The rearward end portion 61' of the control member is offset to the left and provided with a transverse groove 65 through which passes a shoulder screw 66 threading into an ear 67 provided on a collar 68. This collar is positioned to the left of the carriage and is rotatably mounted on the sleeve 11 but is restrained against longitudinal movement on the sleeve by a pair of collars to its right, hereinafter described, and by a stop collar 69, to its left, which is secured to the sleeve 11 by a set screw 69'. As the control member 61 is moved rearwardly the collar 68 is turned in a clockwise direction to operate suitable means to disengage the feed nut from the feed screw, as is now described.

Secured as by welding to the collar 68 is a bar 70 which extends rightwardly along the sleeve 11 and into the carriage by way of an opening 71 provided in the left wall thereof. Spaced in a clockwise direction about the sleeve 11 from the right end portion of the bar 70 is a pin 72 carried by a collar 73 which is rotatably mounted on the sleeve within the carriage adjacently of the right wall thereof. The collar 73 has a raised cam 74 which is arranged to contact a forwardly extending arm 75 on the feed nut supporting bracket 27 when the collar 73 is turned in a clockwise direction, such contact causing the bracket to be tilted so as to move the feed nut out of engagement with the feed screw. The collar 73 is, however, biased to normally maintain the cam 74 free of the arm 75 to permit the feed nut to normally engage the feed screw as by the spring 30. To obtain this biasing, the collar 73 is splined to the longitudinal rod 8 by extending the pin 72 into engagement with a longitudinal groove 76 in the rod (the sleeve 11 being apertured to permit the pin 72 to pass suitably therethrough), and the rod 8 is biased in a counter-clockwise direction, as viewed from the right, by means of a torsional spring 77 (see Figure 1) secured to the rod by a pin 78 and to the standard 2 by a pin 79, the rod being restricted in its counter-clockwise movement by the contact of an arm 80 (see Figure 12), secured to the rod at the right end thereof, with a pin 81 on the standard 3.

The control member 61 is urged forwardly by means of a tension spring 82 connected between a leftwardly extending lug 83 on the carriage arm 15 and the rearward portion 61' of the control member. Extending forwardly from the carriage arm 15 to the right of the control member 61 is a position defining member 84 for the control member. When the control member 61 is moved rearwardly from its released or operating position shown in Figure 4 to a point substantially midway of its released position and a constrained position where the fingerpiece 64 is just flush with the defining member 84—which constrained position is hereinafter called the backspacing position of the control member—the collar 68 is turned sufficiently to bring the bar 70 into contact with the pin 72; further rearward movement of the control member 61 from its above mentioned mid to backspacing position causes the collar 73 to be turned in a clockwise direction, as by the contact of the bar 70 with the pin 72. Such turning of the collar causes the cam 74 to slidably contact the arm 75, thereby moving the arm downwardly to disengage the feed nut from the feed screw. Upon the release of the control member 61 the cam 74 is moved free from the arm 75 by the spring 77, the feed nut then moving back into engagement with the feed screw as by the spring 30. (It will be seen that the movement of the control member 61 from released to mid position mentioned above constitutes a lost motion; this is done for reasons hereinafter explained.)

The sound translating device 16 may be of any suitable variety which is selectively conditionable for recording and reproducing. For the purpose of illustrating my invention, a form of sound translating device is described which is well known in the art. This sound translating device may in the present instance be sufficiently described by the statement that it comprises a circular frame 85 bearing the aforementioned sound tube 17' (to which the speaking tube 17 is coupled) and a downwardly extending lug 86 to which is pivoted a sound box 87 and a biasing weight 88, the weight and sound box being substantially concentrically disposed relative to the frame 62 and the weight being directly beneath the sound box. Operatively associated with the sound box 87 is a recorder stylus 89 and with the biasing weight 88 is a reproducer stylus 90, these styli being respectively controllable for movement into and out of contact with the record 7. The sound box and biasing weight are retainable in upward or raised positions free of the record and are releasable to move, as by gravity, towards the record. When both the biasing weight 88 and sound box 87 are released, they assume respective positions relative to the record, as shown in Figure 3. The sound box and biasing weight are then so positioned relative to the record as to maintain the recorder stylus 89 in contact with the record so as to condition the translating device for recording. Sound waves which are then conducted into the sound box 87, as by way of the speaking tube 17, will actuate the recorder stylus to form on the record, as the record is rotated and the translating device is fed therealong, a continuous groove having modulations in accordance with the sound waves.

When only the biasing weight 88 is released for free downward movement towards the record, the sound box 87 being retained in an upward or raised position, the reproducer stylus 90 is brought into contact with the record and the sound translating device is conditioned for reproducing. When the translating device is so conditioned vibrations imparted to the reproducer stylus, as it tracks a modulated groove of a rotating record, are transmitted to the sound box 87 to create sound waves therewithin in accordance with the modulations of the groove being tracked, these sound waves being conducted away from the translating device by the speaking tube 17.

When both the sound box 87 and biasing weight 88 are maintained in raised positions, both the recorder stylus 89 and reproducer stylus 90 are held out of operative relationship, or contact, with the record to place the translating device in an inoperative condition.

With the above arrangement of sound translating device, it is seen that when the biasing weight 88 is maintained in a raised position, the sound box 87 is necessarily also maintained in a raised position to place the translating device in inoperative condition. Upon releasing only the biasing weight from such raised position the translating device will be conditioned for reproducing; whereas upon releasing both the biasing weight and sound box the translating device will be conditioned for recording. Thus the translating device is rendered inoperative or operative by merely raising or lowering the biasing weight, and when rendered operative it is selectively conditionable for reproducing and recording by raising and lowering the sound box.

The means for selectively placing the sound translating device into inoperative condition and respective operative conditions for recording and reproducing comprises a pair of angular lifting fingers 91 and 92 respectively adapted to contact a tab 93 on the sound box and a lug 94 on the biasing weight to hold the sound box and weight in raised position. The lifting fingers 91 and 92 are each pivoted on the cross rod 29 and are held in spaced relationship thereon by the spacers 95. Extending upwardly from the respective fingers 91 and 92 are relatively short arms 91' and 92' and connected between the respective arms 91' and 92' and the cross rod 31 are tension springs 96 and 97, which springs urge the fingers 91 and 92 each upwardly. The finger 92, which controls the biasing weight 88, is normally held in a downward position free from the biasing weight by the contact of a lug 98 on the collar 73 with a cam face 99 on the inner edge of the finger, as is shown in Figure 3. The translating device is thus normally placed in operative condition by reason of the biasing weight 88 being normally released, but whenever the collar 73 is turned in a clockwise direction, as when the feed nut 26 is disengaged from the feed screw 25, the lug 98 moves downwardly and away from the cam face 99 to permit the finger 92 to move upwardly to hold the biasing weight 88 in raised position, thereby placing the translating device in inoperative condition. Thus movement of the control member 61 to back-spacing position not only disengages the feed nut 26 from the feed screw 25 but also places the translating device in inoperative condition, the release of the control member causing the feed nut to re-engage the feed screw and the translating device to return to operative condition.

When the translating device is rendered operative it will be conditioned for recording or reproducing depending on whether the lifting finger 91, which controls the sound box 87, is in a downward position free from the sound box or in a raised position to hold the sound box away from the record. To control the lifting finger 91 a collar 100 is rotatably mounted on the sleeve 11 within the carriage to the left of the collar 73. Secured to the collar 100 is a control lever 101 which extends upwardly through an opening 102 in the top of the carriage. The collar 100 controls the lifting finger 91 by the contact of a lug 103 on the collar (which is in all respects similar to the lug 98 on the collar 73) with a cam face 104 on the lifting finger. When the control lever 101 is moved forwardly into recording position, the position it occupies in Figure 3, the lifting finger 91 is held by the lug 103 in a downward position free from the sound box 87, as is shown in Figure 6. The translating device is then, as whenever it is rendered operative, conditioned for recording. (The upward urging of the finger 91 tends to move the control lever 101 out of recording position but this is prevented by the provision of a detent 104' on the finger, shown in Figure 6.) When the control lever 101 is moved rearwardly into a substantially vertical position, hereinafter called its reproducing position, the lug 103 is moved downwardly and away from the cam face 104 to permit the finger 91 to move upwardly to hold the sound box in a raised position. The translating device is then, as whenever it is rendered operative, conditioned for reproducing.

In accordance with my invention I provide simple and generally improved means for automatically controlling a phonograph in such respects as will enable the operator to reproduce previously recorded matter, at will, and thereafter to resume recording, with a minimum of distraction. While, in accordance with my invention, some operations in the use of the machine are automatically performed, this is not done at the expense of encumbering the performance of other operations necessary to the complete functioning of the machine. On the contrary, it is a feature of my invention to provide such simple and improved means as will enable the operator to readily control all functions of the machine. To this end the phonograph is arranged so that it may be readily conditioned to have certain automatic features to facilitate the reproduction of selected portions of previously recorded matter, as during the process of recording, or to have these automatic features removed to permit the machine to be used with facility for the sole purpose of reproducing.

In the first embodiment of my invention the automatic features include the automatic conditioning of the machine for reproducing incidental to a backspacing of the translating device, and the automatic conditioning of the machine for recording when the translating device is next advanced to a predetermined position relative to the position from which it was backspaced. The first of these automatic features—the conditioning of the sound translating device for reproducing incidental to its backspacing—may now be described.

In order to backspace the carriage it is essential that the feed nut 26 be disengaged from the feed screw 25; it is moreover important that the translating device be rendered free from the record—i. e., placed in inoperative condition so that the record may not be scratched or marred in any way by the styli during the backspacing of the carriage. These functions of disengaging the feed nut from the feed screw and of placing the sound translating device in inoperative condition are each performed incidental to the movement of the control member 61 to backspacing position, as hereinbefore described. In order that such movement of the control member 61 may also perform the function of turning the collar 100 into reproducing position so as to cause the translating device to be conditioned for reproducing when the control member is released, the collar 68 is coupled with the collar 100 by means of a pair of collars 105 and 106 each rotatably mounted on the sleeve 11 between the collar 68 and the left wall of the carriage. The collar 105, which is adjacent to the collar 68, is provided with an upwardly extending lug 107 in which is pivoted, by a pivot screw 108', a short transverse lever 108. This lever extends leftwardly into a position between a pair of shoulders 109 and 109' provided on the collar 68, the shoulders being formed by the provision of an open sector in a flange segment 110 which extends rightwardly from the rim of the collar 68, as is shown in Figures 1, 4, 5 and 10. The collar 106, which is interposed between the collar 105 and the left wall of the carriage, has an upwardly extending ear 111 carrying a cross pin 112. This pin extends leftwardly to normally contact the lug 107 and rightwardly through an arcuate opening 113 in the left wall of the carriage to normally contact a radially extending pin 114 provided in the collar 100, the contact of the pin 112 with the lug 107 and pin 114 occurring on the sides of the lug 107 and pin 114 which are clockwise therefrom relative to the sleeve 11. The pin 112 is normally urged against the pin 114 by a torsional spring 115 connected between the pin 112 and a lug 116 extending downwardly from the collar 100. The collar 105 is biased in a counter-clockwise direction but is restrained against counter-clockwise movement from the position it occupies in Figures 1, 4 and 5, as is hereinafter described. When the collar is in such restrained position the lever 108, by its contact with the shoulder 109 defines the released position of the forwardly urged control member 61.

When the control member 61 is moved rearwardly from released to mid position aforementioned the lever 108 is brought into contact with the shoulder 109' (and the bar 70 into contact with the pin 72 as aforementioned). Further rearward movement of the control member 61 to backspacing position, causes the collars 68, 105, 106 and 100 to turn in unison, the collar 105 being turned by the collar 68 by the contact of the shoulder 109' with the lever 108, the collar 106 being turned by the collar 105 by the contact of the lug 107 with the pin 112, and the collar 100 being turned into its reproducing position by the collar 106 by reason of the resilient coupling of the pin 112 with the pin 114. Upon the release of the control member 61 the collar 100 remains in its reproducing position but the collar 68 returns, in a counter-clockwise direction, to restore the translating device to operative condition and to re-engage the feed nut with the feed screw, the operative condition of the translating device being now in a condition for reproducing.

The automatic conditioning of the sound translating device for recording, subsequent to the conditioning of the machine for the selective reproduction of previously recorded matter, is controlled by a novel and improved means for defining the distance of spacing of the sound translating device from any desired position of the device in its path. In accordance with my invention this defining means is so controlled as to be normally retained in inoperative condition, and to be placed in operative condition only as an incident of conditioning the machine for selectively reproducing recordations as noted above. Such control of the defining means is highly useful in simplifying the operation of the machine. For example, the defining means may be retained in a neutral or unoperated position when it is in inoperative condition, as by a biasing thereof, and may be put into operation only when called upon to perform a useful function of definition. After the defining means, by its movement from neutral position, has performed its normal function, it may be automatically put out of operation as an incident to the completion of the performance of its function. When the defining means is put out of operation it may be automatically restored, by its own biasing, to neutral position. Thus the defining means may be automatically restored for operation from any desired position of the translating device in its path, either as an incident to the completion to the performance of its normal function or, as later described, as an incident to the performance of a manipulation on the machine.

Reference being had to Figures 1, 2, 3, 4 and 11 it will be seen that the defining means comprises a disk-shaped defining member 117 having a hub 118 pivotally mounted on the back longitudinal rod 9 between the left and right walls of the carriage 10. The defining member 117 carries a defining pin 119 and is biased in a clockwise direction, as viewed from the right, by means of a torsional spring 120 hooked at one end to the defining member 117 as at 121 and connected at its other end to a pin 122 secured to the left wall of the carriage. Movement of the defining member 117 in its biased direction is, however, normally restricted to a neutral position as shown in Figures 3 and 9 by the contact of the defining pin 119 with a bar 123 of suitable insulating material which extends rightwardly from a spring arm 124. The spring arm 124, and a spring arm 125 which is similar thereto, are mounted insulatedly from each other in cantilever fashion in a stack 126 to form a pair of normally open contacts for a switch 127, as shown in Figure 9. The stack 126 and springs 124 and 125 are disposed in a casing 128, the stack being secured to the casing by a screw 126'. The casing has an opening 128' at one end from which extends the bar 123 and an opening 128" at the other end from which extends a two-wire cable 129 making connection with the spring arms. The casing 128 is secured, by the pins 130 to a bracket 131 which is secured to the left wall of the carriage 10 by the screws 132, the casing being mounted so that the spring arms 124 and 125 extend horizontally along the rear of the carriage in substantially parallel relation to the defining pin 119.

The defining member 117, as because of its biasing, normally urges the spring arm 124 downwardly towards the spring arm 125. The biasing of the defining member is, however, insufficient to hold the spring arm 124, against its own biasing, in contact with the spring arm 125, such contact of the spring arms 124 and 125, or closing of the switch 127, being made only when the defining member 117 is driven, in its biased direction, beyond its neutral position.

The driving means for the defining member 117 comprises a disk-shaped drive wheel 133 having a hub 133' rotatably mounted on the rod 9 to the right of the defining member 117 and normally spaced therefrom, the drive wheel being moved along the rod 9 by the carriage by the engagement of the right wall of the carriage with an annular groove 133" in the hub 133'. The defining member is geared to a pinion gear 134 which is pivoted, by a pivot screw 135, to a lug 136 on the lower rearward end of the right wall of the carriage, as is shown in Figure 2. The pinion gear 134 is integrally formed with a spur gear 137 which engages a longitudinal stationary rack 138 disposed in parallel relation to the rod 9 and supported on left and right lugs 139 and 140 respectively provided on the left and right standards 2 and 3. By this means the drive wheel is turned in clockwise and counter-clockwise directions as the carriage or sound translating device is respectively advanced and backspaced in its path along the mandrel, the drive wheel being turned through substantially one revolution as the translating device is moved through the length of the record.

The defining member 117 carries on its face which is adjacent to the drive wheel 133 an annular pad 141, suitably of leather or felt (see Figure 2). The pad 141 is normally held out of contact with the drive wheel 133 by means of a compression spring 142 coiled about the rod 9 between the defining member and drive wheel. The defining member may, however, be moved into engagement with the drive wheel at will by a clutch lever 143 which is pivoted on the carriage at a point directly in front of the rod 9, the clutch lever being connected by a pin 144 to a vertical shaft 145 which is pivotally mounted in upper and lower bosses 146 and 147 extending inwardly from the left wall of the carriage. Partially extending through the clutch lever from the inner end thereof is a cylindrical recess 148 (see Figure 11) in which is carried a spherical ball 149 biased outwardly by a compression spring 150 but restricted in its outward movement by a peening of the inner end of the clutch lever. Between the ball and spring is provided a suitable spacer or seat 151 to permit easy turning of the ball. When the clutch lever 143 is moved from a disengaged or inoperative position, such as is shown in Figure 1, to its engaged or operative position wherein it is substantially vertical to the face 117' of the defining member 117, the ball 149 is urged against the face 117' to hold the defining member 117, against the force of the biasing spring 142, into frictional engagement with the drive wheel 133. The defining member is then rotatably connected with its drive wheel so as to be turned with a movement of the carriage, the direction of turning being against and with its biasing—i. e., counter-clockwise and clockwise—as the carriage is respectively backspaced and advanced along the record.

When the control member 61 is moved to backspacing position the clutch lever 143 is normally moved to engaged or operative position by means of a link 152 connecting the lug 107 of the collar 105 with an arm 153 extending leftwardly from the shaft 145 and secured thereto by a pin 154, the link 152 being pivotally connected to the lug 107 and arm 153 by the respective pins 155 and 156. The clutch lever 143 is biased into disengaged or inoperative position (and the collar 105 is thereby biased in a counter-clockwise direction) by a tension spring 158 connected between the pin 155 and a pin 158' on the left wall of the carriage, the inoperative position of the clutch lever being defined by the contact of the arm 153 with an edge 157 on the left wall of the carriage. When the clutch lever 143 is moved into its engaged position, it is releasably held there by means of a latch 159 having at its end portion a hook 159' (see Figure 8) adapted to catch on an arm 160 of the clutch lever 143, which arm extends leftwardly through an opening 161 in the left wall of the carriage. The latch 159 is pivoted by a screw 162 to a stud 163 fastened to the bracket 131, and is biased into latching or operative position by a tension spring 164 (see Figures 3 and 8), the latch being held out of operative position when the clutch lever 143 is in its released position by the contact of the arm 160 with the lower edge 159" of the hook 159'.

In consideration of the structure so far described, it is seen that when the machine is conditioned for recording the relative positions of its control means are as follows: the control member 61 is held by the spring 82 in released position as defined by the contact of the lever 108 with the shoulder 109; the clutch lever 143 is held in released or disengaged position by the spring 158; the collar 100, which controls the recording and reproducing conditions of the translating device, is in recording position; and the collar 105 occupies the position shown in Figure 4. When the control member 61 is moved to backspacing position, the following actions occur: the collar 73 is turned by the contact of the bar 70 with the pin 72 to disengage the feed nut from the feed screw and to render the translating device inoperative; the collar 105 is turned by the contact of the shoulder 109' with the lever 108 to place the defining means in operative condition; and the collars 106 and 100 are each turned by the contact of the lug 107 with the pin 112, the turning of the latter being from recording to reproducing position and causing the lifting finger 91 to move into its upward position. While the control member 61 is held in backspacing position the carriage is free to be backspaced, such backspacing causing the defining pin 119 to move in a counterclockwise direction, away from the bar 123 of the switch 127, coordinately and proportionally with the movement of the carriage. When the control member 61 is next released, the collar 73 is returned by its biasing to cause the feed nut to reengage with the feed screw and the translating device to return to operative condition. However, the collar 100 remains in reproducing position and the clutch lever 143 remains held in its engaged position by the latch 159. By reason of the clutch lever 143 being held in engaged position the collar 105 is held in its moved position to cause the control member 61, upon its release, to be held in its mid position by the contact of the lever 108 with the shoulder 109. Thus whenever the control member 61, upon its release, assumes its mid position it is a visual indication that the defining means is in operative condition. Under some conditions, as herein later described, the control member 61, upon its release, is fully returned, thereby indicating that the defining means is in inoperative condition.

When in the reproduction of previously recorded matter the sound translating device is advanced to the position from which it was backspaced the defining pin 119 is again brought into contact with the bar 123 of the switch 127. A further advance of the sound translating device will cause the spring arm 124 to be moved, by the defining pin 119, into contact with the spring arm 125 to close the switch 127. Such closing of the switch causes a solenoid 165 to be actuated to cause the machine to be conditioned for recording. This solenoid is ironclad by a frame 166 mounted on a turned over lug 131' of the bracket 131, and comprises a plunger 167 coupled to the lug 116 of the collar 100 by a link 168 which is pivotally connected to the plunger 167 and lug 116 by the respective pins 167' and 116'. When the switch 127 is closed the solenoid 165 is connected with the source of power to the machine, as is shown in Figure 17; the plunger is then propelled rearwardly and the collar 100 is thereby turned into its recording position. In the terminal movement of the plunger 167, it impinges against an arm extension 169 of the latch 159 to release the latch from the clutch lever 143. When the clutch lever is unlatched it is returned by the spring 158 to its released or disengaged position and the control member 61 is returned from its mid to released position by the movement of the collar 105 which attends the release of the clutch lever 143. Thus when the translating device is advanced a predetermined distance beyond the position from which it was backspaced, the machine is not only automatically conditioned for recording but the defining means is rendered inoperative and as an incident thereto the defining member 117 is returned, as by the spring 120, to its neutral position to effect a complete restoration of the defining means.

It may be here noted that the switch 127, in connection with the defining means hereinbefore described, constitutes a differentially responsive means which is operable, at will, to distinguish between any selected position of the translating device in its path and a position of the translating device spaced or advanced therefrom, the switch being respectively rendered open and closed when the translating device is in the former and latter positions.

It is seen that the automatic conditioning of the sound translating device for recording and the placing of the defining means in inoperative condition, as well as the restoration thereof, occurs incidental to such predetermined advance of the sound translating device as will cause the switch 127 to be closed. In order that the automatic conditioning of the sound translating device for recording may occur almost immediately after the termination of the reproduction of the matter last recorded, the reproducer stylus 99 is positioned to the left of the recorder stylus, i. e., behind the recorder stylus in respect of the direction of carriage advance, as is shown in Figure 4, at a distance slightly less than the distance of the predetermined advance above mentioned. With this arrangement it is seen that if the operator desires to reproduce, or listen back on, a recorded area of a width equivalent to the transverse distance between the recorder and reproducer styli, the operator need not backspace the carriage but need only to move the control member 61 to backspacing position and then release it therefrom, to condition the translating device for reproducing and to render the defining means operative. The next advance of the carriage causes the defining pin 119 to be moved onwardly to close the switch 127 and to thereby condition the machine for recording. However by reason of the transverse distance between the recorder and reproducer styli being less than the distance of carriage advance required to close the switch 127 the automatic conditioning for recording does not occur before the reproducer stylus has advanced at least beyond the recorded area.

It is seen that the machine is automatically conditioned for recording by a limited advance of the carriage subsequent to a manipulation of the control member 61 to backspacing position and its release therefrom. Since the translating device is in condition for reproducing during such limited advance of the carriage, there will arise a narrow vacant space on the record before the machine is reconditioned for recording, thereby avoiding any possible overlapping of recorded areas. The length of this vacant space may be readily controlled as, for example, through an adjustment of the spacing between the spring arms 124 and 125 of the switch 127, which spacing defines the distance of carriage advance required to close the switch.

When the carriage is backspaced for the purpose of reproducing a selected portion of recorded matter it may not always be found desirable to reproduce the entire area traversed by the backspacing of the carriage. In this case after the operator has reproduced the selected recorded matter he may move the control member 61 to its backspacing position and then manually advance the carriage to a position wherein the reproducer stylus is in advance of the area last recorded, as is heretofore described. When the carriage reaches such position it is blocked against further advance, so long as the control member 61 is retained in its backspacing position, by the impingement of the defining pin 119 against the bar 123, which bar is limited in movement in the direction of advance of the pin 119 to substantially the contact position of the spring arm 124 with the spring arm 125 by reason of the arm 125 being backed by a stop member 169, made of suitable insulating material and shown in Figure 9. When the carriage is in such stopped position the solenoid 165 is energized by reason of the closed condition of the switch 127, but so long as the control member 61 is held in backspacing position the collar 100 is held in reproducing position and the solenoid is thereby restrained from operating. However, upon the release of the control member the solenoid is operated to place the translating device in condition for recording and the defining means in inoperative condition. Coordinately with the placing of the defining means in inoperative condition, the switch 127 is opened to break the circuit of the solenoid and the defining means is restored to neutral position by the biasing of the spring arm 124 of the switch.

It is seen that so long as the defining means is in operative condition a manual advance of the carriage is limited to a predetermined distance—i. e., substantially the distance required to close the switch 127. In order that the carriage may be advanced freely along the record the control member 61 is rendered movable to a constrained position beyond its backspacing position—which position is hereinafter called the inoperating position of the control member—to place the defining means in inoperative condition while yet retaining the feed nut disengaged from the feed screw and the translating device in inoperative condition. This inoperating position of the control member 61 is defined by the impingement of the finger-piece 64 against the lug 83 on the carriage arm. When the control member 61 is moved from backspacing to inoperating position the collars 68, 105, 106 and 73 are each turned in unison in a clockwise direction, but the collar 100 is held in reproducing position by the contact of the control lever 101 with the rearward edge of the opening 102 in the carriage, the cross pin 112 moving away from the pin 114 and the torsional spring 115 being flexed by the turning of the collar 106 relative to the collar 100. Such turning of the collar 73 does not alter the condition of the translating device or the relative position of the feed nut to the feed screw since the translating device is maintained in inoperative condition by the upward biasing of the lifting finger 92 and the feed nut is maintained out of engagement with the feed screw by reason of the arm 75 remaining in contact with the relatively long cam 74. However, the turning of the collar 105, which accompanies the movement of the control member from backspacing to inoperating position, causes the clutch lever to be turned in a clockwise direction, through its engaged position and into an inoperating position shown in dash-dot lines in Figure 4, thereby disengaging the defining member 117 from its drive wheel 133 to place the defining means in inoperative condition. Thus so long as the control member 61 is held in inoperating position the carriage is freely manually movable along the record. Upon the release of the control member from inoperating position the machine is restored to the condition in which it is placed when the control member is moved to backspacing position and then released: the clutch lever 143 being returned by the spring 158 to engaged position; the translating device being returned to reproducing condition and the feed nut being re-engaged with the feed screw as by reason of the spring 77; and the control member 61 being returned to mid position by the spring 82.

The carriage is rendered free to be returned to start position by holding the control member 61 in either its backspacing or inoperative position. If the carriage is returned with the control member 61 in backspacing position the defining means is moved out of neutral position, but if the carriage is returned with the control member in inoperative position the defining means remains in inoperative condition. In either case, upon the release of the control member the translating device is conditioned for reproducing. To place the translating device in condition for recording the control lever 101 is manually moved into recording position. While the collar 106 is locked whenever the clutch lever 143 is latched in engaged position, the control lever is yet movable into recording position by reason of the collar 100 being resiliently connected, as by the spring 115, with the collar 106. When the control lever 101 nears its recording position the plunger 167 impinges against the arm 169 of the latch 159 to release the latch from the clutch lever 143, the defining means then returning to inoperative condition.

Whenever the machine is used solely for reproducing purposes it is important that the defining means be retained in an inoperative condition to avoid any possible automatic shifting of the machine into a condition for recording. In accordance with my invention, when the machine is to be used solely for reproducing purposes, it is placed in reproducing condition by manually moving the control lever 101 from recording to reproducing position while the control member 61 is in released position. Such movement of the control lever 101 causes the translating device to be conditioned for reproducing, and also causes the collar 106 to be turned, by the contact of the pin 114 with the cross pin 112, relative to the collar 105. Such relative turning of the collar 106 causes a cam 106' provided thereon to contact the right end of the lever 108 and to thereby tilt the lever, in a counter-clockwise direction as it is seen in Figure 10, against the force of a biasing spring 170 welded to the link 152 (see Figure 5). As the lever 108 is so tilted the left end thereof is moved downwardly out from between the shoulders 109 and 109' of the collar 68 to thereby operatively disconnect the control member 61 from the collar 105. The control member 61 may then be freely manipulated to disengage the feed nut from the feed screw and to render the translating device inoperative, to permit manual movement of the carriage, without rendering the defining means operative, this inoperative condition of the defining means being visually indicated by the full return of the control member 61 upon its release. To restore the machine to its normal condition for recording it is only necessary to manually return the control lever 101 to recording position. As the control lever 101 is so returned the cam 106' is moved free from the lever 108, and the lever 108 is then restored by the spring 170 to its normal position to operatively connect the control member 61 with the collar 105.

It is important that the translating device be placed in inoperative condition whenever a record is to be removed from or mounted on the mandrel. To force the operator to place the translating device in inoperative condition to permit a record change there is pivoted on the standard 3 by a pin 171 an obstructing arm 172 which extends forwardly to engage an annular groove 173 in the handpiece 14, as shown in Figure 12. The obstructing arm 172 is normally retained in its engaged or forward position by means of a tension spring 174 connected between an ear 175 on the arm and a pin 176 on the standard 3, the forward position of the arm being defined by the contact of the ear 175 with a stop pin 177 on the standard. When the arm 172 engages the groove 173 the handpiece 14 is locked so that it cannot be moved inwardly to eject a record from the machine. When, however, the control member 61 is moved to backspacing or inoperating position the arm 80 on the rod 8, hereinbefore mentioned, impinges upon a short arm 172' of the arm 172 to move the obstructing arm 172 out of the groove 173 and out of the path described by a change of record on the mandrel, thereby permitting a change of record—i. e., record mounting and removal—at will.

In Figures 13, 14, 15, 16 and 18 there is shown a second embodiment of my invention which is largely similar in structure to my first embodiment but which in function differs therefrom in the actions which are caused to automatically occur after the selective reproduction of previously recorded matter. When the control member 61 is moved to backspacing and inoperating positions the same actions occur as in my first embodiment; also upon the release of the control member from either backspacing or inoperating position, it returns to mid position to place the translating device in reproducing condition and the defining means in operative condition, the same as in my first embodiment. However, when the control member 61 is so released to mid position and the translating device is fed in an advancing direction to reproduce matter previously recorded, the machine is automatically stopped when the reproduction of the recordation last made is terminated; and when the start and stop hand switch 52 is next released to stop position the machine is automatically and completely restored to its normal condition for recording. In this mode of operation the operator is positively informed when the reproduction of the matter last recorded is terminated as by the stopping of the machine; moreover, when the machine is automatically conditioned for recording the recorder stylus is lowered into contact with a record which is then stationary to avoid possible stubbing of the stylus on the record.

Many elements, as well as combinations of elements, in this second embodiment are in all respects similar to corresponding elements of my first embodiment. Where such similarity occurs between corresponding elements of the two embodiments they are given the same reference characters and are not further described except in their relation to new and slightly changed elements, which are given new reference characters.

This second embodiment differs principally from my first embodiment in respect of the means for controlling the release of the clutch lever 143 from engaged position and of the means for controlling the solenoid 165. Reference being had to Figures 14 and 15, it will be seen that a latch 178 for holding the clutch lever 143 in engaged position is directly controlled by the defining member 117. The latch 178 is pivoted on the stud 163 by the screw 162, and is biased into its latched or operative position by a tension spring 179 connected between the latch and a pin 180 on the carriage. When the clutch lever 143 is in its released or inoperative position, the latch 178 is held in a tilted or inoperative position by the contact of a flat face 178' on the latch with the clutch arm 160, the latch snapping downwardly into operative position when the clutch lever 143 is moved into its engaged position. The latch 178 is operatively connected with the defining means by means of an arm 181 on the latch which extends to the right, rearwardly of the carriage, into the path of the defining pin 119. Mounted in cantilever fashion on the arm 181 is a short upwardly biased spring 182 whose free end also extends into the path of the defining pin 119. When the defining means is in inoperative condition the defining pin 119 is urged downwardly against the spring 182 by reason of the biasing of the defining member 117 as caused by the spring 120. While the biasing of the defining member is directed to urge the latch in a clockwise direction as viewed from the right—the direction of movement of the latch from operative to inoperative position—the biasing of the defining member is insufficient to cause a substantial flexure of either the spring 179, which urges the latch into operative position, or of the spring 182 contacted by the defining pin 119. The position in which the defining member 117 is thus held by the latching means for the clutch lever 143 constitutes the neutral or unoperated position of the defining member, which is the position it occupies in Figure 14.

As the clutch lever 143 is moved into engaging position the clutch arm 160 is moved free from the face 178' and the latch 178 then snaps into operative position. It will be seen that when the clutch lever 143 is in engaged position the defining pin 119 is held fixed in position by reason of the engagement of the defining member 117 with its drive wheel 133 (it being presumed that the translating device is not now in travel) and that therefore a movement of the latch 178 into operative position is resisted by the contact of the spring 182 with the defining pin 119. However, the spring 179 is made strong enough to move the latch 178 into operative position against the resistance of the spring 182, the free end of the spring 182 being moved substantially into contact with the arm 181 as the latch 178 is moved to its operative position.

When the carriage is backspaced while the defining means is in operative condition the defining pin 119 is moved away from the arm 181 in proportion to the distance of backspacing of the carriage. When the carriage is next advanced to the position from which it was backspaced the pin 119 contacts the spring 182 and moves the free end thereof substantially into contact with the arm 181 of the latch 178, the latch being yet retained by its biasing spring 179 in operative position. However as the carriage is next advanced a predetermined distance beyond the position from which it was backspaced the defining member 117 is moved onwardly to cause the latch 178 to be released from the clutch lever 143. The clutch lever then returns to its released or disengaged position as by the spring 158 to free the defining member 117 from its drive wheel 133, the defining member then returning as by the spring 182 to its neutral position.

It is again preferred that the reproducer stylus 99 be spaced to the left of the recorder stylus 89 as heretofore described in connection with my first embodiment, the transverse distance between the styli being slightly less than the predetermined distance through which the carriage must be advanced, subsequent to a placing of the defining means into operative condition, to cause the defining means to be placed into inoperative condition. Thus when the machine is conditioned for the selective reproduction of previously recorded matter, as by moving the control member 61 to backspacing position, backspacing the carriage if necessary, and then releasing the control member, the defining means is automatically restored to inoperative condition when the carriage is next advanced, either manually or by the feed screw 25, to a position wherein the reproducer stylus is slightly in advance of the area last recorded upon. In accordance with my invention, when the carriage is manually advanced to such a position it is stopped therein, so long as the control member 61 is retained in backspacing position, by the defining pin 119 being moved against the arm 181 to force the latch 178 against a stop pin 184, which pin defines the unlatched or inoperative position of the latch.

As the defining means is restored to inoperative condition a switch 185, which may be of a double-pole double-throw variety, is thrown to cause the stopping of the machine. The switch 185, which appears diagrammatically in Figures 15 and 18, is secured by a bracket 186 to the right wall of the carriage and comprises a pair of pole members 187 and 188 bridged together by a link 189 of suitable insulating material and respectively biased by a spring 190 into contact with contact members 191 and 192, as indicated in Figure 18. The pole members 187 and 188 may be moved against the direction of their biasing to respectively break contact with the contact members 191 and 192 and thereafter to make contact with contact members 193 and 194 by imparting rearward movement to a switch arm 195 which extends laterally through an opening 196 in the right wall of the carriage, the arm 195 being urged forwardly into the position it occupies in Figure 15 by the biasing of the switch.

The pole member 187 and its contact member 191 are serially connected in a line conductor 197 which connects one side of the plug 34 with the pole member 53 of the hand switch 52, the other contact member 193 which is associated with the pole member 187 being connected by a line conductor 198 to the contact member 54 of the hand switch 52. The pole member 187 normally contacts the contact point 191, by reason of its biasing, thereby normally rendering the hand switch 52 selectively operable to start and stop the machine as heretofore described. When the switch 185 is thrown to bring the pole member 187 in contact with the contact member 193 a circuit is completed through the stop coil 46 of the actuating mechanism 44, the same as when the hand switch 52 is released to stop position, to disengage the clutch C and to thereby stop the machine. Such throwing of the switch 185 is made to occur as an incident to the placing of the defining means into inoperative condition as is now described.

Slidably mounted on the inner side of the left wall of the carriage as by a shoulder screw 199 is a bracket 200 having a front-to-back extending slot 201 through which the screw 199 slidably passes. The bracket 200 is provided with an L-shaped platform 202 (see Figure 15) having the lower leg thereof pivotally connected by a pin 203 to an arm 204 aligned with the clutch lever 143 and secured to the shaft 145 of the clutch lever 143 at a point substantially midway of the length of the shaft. On the lower leg of the platform 202 are provided turned-over ears 205 supporting a cross pin 206 on which is pivoted a narrow plate 207 extending forwardly of the platform 202. The plate 207 partially rests on platform 202 in a horizontal position and is moreover biased downwardly into such position by a cantilever spring 208 connected to the platform by the pins 208'. Carried by and extending through the plate 207 at a point centrally thereof is a pin 209 having a beveled face 209' on the lower end thereof which is adapted to catch on an upward extension 195' of the switch arm 195 to throw the switch.

When the clutch lever 143 is moved to engaged position to place the defining means in operative condition, the shaft 145 is turned in a clockwise direction and the bracket 200 and the plate 207 carried thereon are each moved forwardly. As the plate 207 is so moved the pin 209 slides over the extension 195' of the switch arm 195, the plate first tilting upwardly and then snapping downwardly as by the spring 208 to cause the pin 209 to catch upon the switch arm 195. When the clutch lever 143 is subsequently released to place the defining means in inoperative condition, the plate 207 is returned in a rearward direction to its initial position, the switch arm 195 being moved rearwardly by the pin 209 with the plate. The switch 185 is thus thrown to bring its pole member 187 into contact with its contact member 193 to stop the machine in the manner heretofore described.

When the machine is automatically stopped by the defining means, the hand switch 52 is yet in start position. As the operator next releases the hand switch to stop position the circuit of the solenoid 165 is closed with its power source to cause the machine to be conditioned for recording. It is seen that the solenoid 165 is connected by the link 168 to the collar 100 in the same manner as in my first embodiment; the circuit of the solenoid, however, serially includes the pole member 188 and associated contact point 194 of the switch 185, the pole member 53 and associated contact member 54 of the hand switch 52, and also the pole member 187 and associated contact point 193 of the switch 185. When the machine is automatically stopped by the placing of the defining means in inoperative condition, the pole member 187 and the pole member 188 make connection with the respective contact points 193 and 194 but the pole member 53 does not make connection with the contact member 54 until the hand switch 52 is released to stop position. The release of the hand switch 52 subsequent to the stopping of the machine is a normal act on the part of the operator, and as an incident to such release the solenoid is energized to cause the collar 100 to be moved into its recording position, thereby conditioning the machine for recording.

When the machine is conditioned for recording the switch 185 is restored to its normal position into which it is biased to break the circuit of the solenoid. The means for causing this restoration of the switch 185 comprises a substantially right angle lever 210 pivoted at its vertex by a screw 211 to a stud 212 extending inwardly from the left wall of the carriage just below the link 168. Pivoted to the lever 210 is a slotted stud 213 slidably engaging the left edge 207' of the plate 207, the lever 210 being thus normally held by the plate 207 in such angular position that the leg 210' of the lever, which carries the stud 212, extends forwardly while the other leg 210'' of the lever extends upwardly along the right side of the link 168. In the conditioning of the machine for recording the link 168 is moved rearwardly; when the link is moved through the final portion of its travel a cross pin 214 carried by the link contacts the upwardly extending leg 210'' of the lever 210 and tilts the lever in such a manner as to cause its forwardly extending leg 210' to be moved upwardly. Such tilting of the lever 210 causes the plate 209 to be also tilted upwardly and the pin 209 carried thereon to be released from the switch arm 195. The switch arm 195 then moves forwardly by reason of its biasing to cause the pole members 187 and 188 to break connection with the contact points 193 and 194 and to thereafter make connection with contact points 191 and 192 (of which the contact point 192 is idle in the circuit). The circuit of the solenoid is thus broken and the circuit to the hand switch 52 is restored to render the hand switch operable to start and stop the machine as desired.

Thus it is seen that when the machine is conditioned for the selective reproduction of previously recorded matter and the translating device is next advanced through such predetermined distance as to cause the reproducer stylus to be moved in advance of the area last recorded upon, the defining means is placed in inoperative condition and the switch 185 is at the same time thrown to stop the machine. When the hand switch 52 is next released to stop position the solenoid 165 is energized to cause the switch 185 to be restored and the translating device to be conditioned for recording, thereby placing the machine in its normal recording condition.

Whenever the carriage is returned to initial position, the translating device is left in reproducing condition and the defining means is left in operative condition. Normally the machine will be next used for recording subsequent to such return of the carriage. To condition the machine for recording it is only necessary to manually move the control lever 101 forwardly from reproducing to recording position. When the defining means is in operative condition the collar 106 is held in position by the latched condition of the clutch lever 143. Thus, to permit such movement of the control lever 101 the collar 100 is resiliently connected by the spring 115 to the collar 106, the same as in my first embodiment (the spring 115 also permitting the collar 106 to be moved relative to the collar 100 as when the control member 61 is moved to inoperating position, as is hereinbefore described). As the control lever is moved to recording position the collar 100 is moved relative to the collar 106 and the spring 115 is thereby flexed. However as the control lever 101 nears recording position the latch 178 is released from the clutch lever 143 to cause the defining means to be restored to inoperative condition, the collar 106 then returning into normal position relative to the collar 100. To so release the latch 178 the plunger 167 of the solenoid 165 is operatively connected with the latch by means of a vertically extending lever 215 pivoted by a screw 216 to a stud 217 extending rightwardly from an arm 218 which extends rearwardly of the carriage (see Figures 4 and 15). The arm 218 may be part of a mounting bracket 219 for the solenoid 165, which bracket is secured to the left wall of the carriage by the screws 132, the same as the bracket 131 of my first embodiment. The lower end 215' of the lever 215 slidably engages a turned over edge 220 provided on the arm 181 of the latch 178, and the upper end 215" of the lever extends slightly into the path of the plunger 167. When the plunger is moved rearwardly by the movement of the control lever 101 into recording position, the plunger impinges against the upper end 215" of the lever 215 to turn the lever slightly in a counter-clockwise direction as viewed from the left (see Figure 14), thereby causing the latch 178 to be released from the arm 160 of the clutch lever 143.

Although I have shown and described my invention in certain preferred embodiments, it will be understood that many modifications and changes may be made therein without departing from the scope of my invention, which I undertake to express according to the following claims.

I claim:

1. In a recording and reproducing phonograph including a supporting device for a record and a record-cooperating translating device, one of said devices being advanceable and backspaceable along the other: the combination of a movable indicating member adapted for measuring the displacement of said one device from any position in its path; means holding said indicating member stationary in its path of indicating movement during normal recording operations of the phonograph; means manipulatable to backspace said one device for purposes of playing back portions of matter recorded on the record; and means, rendered effective by said manipulatable means in the movement thereof to backspace said one device, for causing indicating movement to be imparted to said member in proportion to the amount of backspacing of the device.

2. In a phonograph including a record-supporting device and a translating device, one of said devices being advanceable and backspaceable along the other, and drive means actuated in the normal operation of the phonograph to effect a steady progressive advance of said one device: the combination of manual means operable to interrupt the normal operation of the machine and to displace said one device from a position of farthest advance; a movable indicating member for measuring the distance of displacement of said one device; means acting on said indicating member during normal operations of the phonograph to hold the member stationary in its path of indicating movement; a mechanism adapted for imparting indicating movement to said member in accordance with the displacing movements of said one device; and means to cause said mechanism to be put in operation by the operation of said manual means.

3. In a phonograph including a record-supporting device and a record-cooperating translating device, one of said devices being advanceable and backspaceable along the other, and drive means coupled with said one device for advancing the same: the combination of a movable indicating member adapted for indicating the displacement of said one device from any position in its path; means acting on said indicating member during normal advance of said one device to hold the member stationary in its path of indicating movement; means manipulatable to uncouple said one device from said drive means whereby to permit manual displacing of the latter; and means, rendered effective by said manipulatable means in the uncoupling of said one device from said drive means, to impart indicating movement to said indicating member in proportion to the amount of displacement of said one device.

4. In a phonograph including a record-supporting device and a translating device, one of said devices being advanceable and backspaceable along the other: the combination of means for measuring the displacement of said one device from any position in its path, comprising an indicating member independently movably mounted of said one device and normally held stationary at a neutral position in its path of indicating movement, and a normally inoperative mechanism placeable into operative condition at any position of said one device to impart to the indicating member a movement in either direction in accordance with the displacement of the device from the position occupied by the same when the mechanism was put in operation; means associated with said translating device to condition it for recording and reproducing; means operable to backspace said one device for purposes of reproducing portions of recorded matter on a record held by said supporting device; and means, operatively connecting said mechanism with said conditioning and backspacing means and effective only while said one device is backspaced and/or said translating device is in reproducing condition, for retaining said mechanism in operative condition.

5. In a phonograph including a record-supporting device and a translating device, one of said devices being advanceable and backspaceable along the other: the combination of a pair of movable indicating members normally held stationary in the paths of their indicating movements; means actuatable in one direction to impart a unitary movement to both said indicating members and in the other direction to impart a relative movement between said members; and a clutch engageable at will to drivingly connect said actuatable means with said one device whereby displacements of the device in one direction are registered in terms of relative movement between said indicating members and displacements in the other direction in terms of a unitary movement of both said members.

6. In a phonograph including a record-supporting device and a translating device, one of said devices being advanceable and backspaceable along the other: the combination of two measuring members movably mounted for measuring movement independent from that of said one device; means normally holding said members in a neutral relationship and stationary in the path of their measuring movement; a drive for said members connectable at any position of said one device to cause one of said members to move in proportion to the amount of displacement of the device from the position which the device occupied when the drive was put in operation; a one-way coupling between said members permitting an independent movement of said one member in one direction out of said neutral relationship and causing the other of said members to move in unison with said one member in movements of the latter in the other direction out of said neutral relationship; and means, operatively associated with said other member and operated in response to the movement thereof, to disconnect said drive.

7. In a phonograph including a record-supporting device and a translating device, one of said devices being advanceable and backspaceable along the other: the combination of means for measuring the displacement of said one device from any position in its path, comprising two members movable relatively to each other out of a neutral relationship, and a mechanism placeable in operation at any position of said one device to cause a measuring movement to be produced between said members in either direction in accordance with the displacement of said one device from the position occupied by the same when the mechanism is put in operation; means associated with said translating device for adjusting it into inoperative condition and respective operative conditions for recording and reproducing; and means rendered effective by said adjusting means in response to a shifting of said translating device from one predetermined condition to another, for restoring said members to neutral relationship.

8. In a phonograph including a record-supporting device and a translating device, one of said devices being advanceable and backspaceable along the other: the combination of means for measuring the displacement of said one device from any position in its path, comprising two members movable relatively to each other out of a neutral relationship, and a mechanism placeable in operation at any position of said one device to cause a measuring movement to be produced between said members in either direction in proportion to the amount and direction of displacement of said one device from the position occupied by the same when the mechanism is put in operation; means associated with said translating device for adjusting it into inoperative condition and respective operative conditions for recording and reproducing; and means rendered effective by said adjusting means in response to shifting said device into a predetermined one of its conditions, for placing said mechanism out of operation and concurrently restoring said members to neutral relationship.

9. In a phonograph including a record-supporting device and a translating device, one of said devices being advanceable and backspaceable along the other: the combination of means for measuring the displacement of said one device from any position in its path comprising a movable indicating member, means operative during normal progressive operations of the phonograph for holding said indicating member stationary in the path of its indicating movement at a neutral position therein, and a mechanism placeable into operation in any position of said one device to cause a measuring movement of said indicating member to be produced in proportion to the amount of displacement of said one device from its position at the time the mechanism is put in operation; and means to cause said indicating member to be restored to neutral position upon placing said mechanism out of operation.

10. In a phonograph including a record-supporting device and a translating device conditionable for recording and reproducing, one of said devices being advanceable and backspaceable along the other: the combination of means for measuring the displacement of said one device from any position in its path comprising a movable indicating member; means operative during normal progressive operations of the phonograph for holding said indicating member stationary in the path of its indicating movement at a neutral position therein, and a mechanism placeable into operation in any position of said one device to cause a measuring movement of said indicating member to be produced in proportion to the amount of displacement of said one device from the position occupied by the same when the mechanism is put in operation; means to condition said translating device for reproducing and concurrently to place said mechanism in operation; and means, influenced by said indicating member in the movement thereof beyond said neutral position, for shifting said translating device into recording condition and concurrently placing said mechanism out of operation and restoring said indicating member to neutral position.

11. In a phonograph including a record-supporting device and a record-cooperating device, one of said devices being advanceable and backspaceable along the other: the combination of means for measuring the displacement of said one device from any position in its path, comprising two members movable relatively to one another into and out of neutral relationship, and a mechanism having operative and inoperative conditions and effective when in operative condition to produce a measuring movement between said members in proportion to the amount of displacement of said one device from the position occupied by the device when the mechanism is put in operation; and biasing means acting on said members and rendered effective automatically when said mechanism is put out of operation to restore the members to neutral relationship.

12. In a phonograph including a record-supporting device and a record-cooperating translating device, one of said devices being advanceable and backspaceable along the other: the combination of means for measuring the distance of backspacing of said one device from any position in its path, comprising a movable indicating member; means operative during normal progressive operations of the phonograph for holding said indicating member stationary in the path of its indicating movement, and a mechanism rendered operative upon a backspacing of said one device to produce a measuring movement of said indicating member in proportion to the amount of said backspacing; and means, controlled by said indicating member in response to a predetermined advance of said one device beyond the farthest advanced position reached by the device prior to said backspacing, for placing said mechanism out of operation.

13. In a phonograph including a record-supporting device and a record-cooperating translating device, one of said devices being advanceable and backspaceable along the other: the combination of means for measuring the displacement of said one device from any position in its path, comprising a movable indicating member, means operative during normal progressive operations of the phonograph for holding said member stationary in the path of its indicating movement, and a mechanism having operative and inoperative conditions and adapted when in operative condition to produce a measuring movement of said indicating member in proportion to the amount of displacement of said one device from the position occupied by the device when the mechanism was rendered operative; and means, controlled by said indicating member, for placing said mechanism into inoperative condition.

14. In a phonograph including a record-supporting device and a record-cooperating translating device, one of said devices being advanceable and backspaceable along the other: the combination of means for measuring the displacement of said one device from any position in its path, comprising a movable indicating member, means operative during normal progressive operations of the phonograph for holding said member stationary in the path of its indicating movement, and a mechanism having operative and inoperative conditions and adapted when in operative condition to produce a measuring movement of said indicating member in proportion to the amount of displacement of said one device from the position occupied by the device when the mechanism was rendered operative; means associated with said translating device to adjust it into recording and other conditions; and means, associated with said adjusting means and actuated in response to the placing of said translating device into recording condition, for placing said mechanism into inoperative condition.

15. In a phonograph including a record-supporting device and a record-cooperating translating device, one of said devices being advanceable and backspaceable along the other: the combination of means for measuring the displacement of said one device from any position in its path, comprising a movable indicating member, means operative during normal progressive operations of the phonograph for holding said member stationary in the path of its indicating movement, and a mechanism having operative and inoperative conditions and adapted when in operative condition to produce a measuring movement of said indicating member in proportion to the amount of displacement of said one device from the position occupied by the device when the mechanism was rendered operative; means associated with said translating device to adjust it selectively into inoperative condition and respective operative conditions for recording and reproducing; means associated with said mechanism for placing it into operative and inoperative conditions; and an operative connection between said adjusting means and said mechanism.

16. In a phonograph including a record-supporting device and a record-cooperating translating device, one of said devices being advanceable and backspaceable along the other: the combination of means for measuring the displacement of said one device from any position in its path, comprising a movable indicating member, means operative during normal progressive operations of the phonograph for holding said member stationary in the path of its indicating movement, and a mechanism having operative and inoperative conditions and adapted when in operative condition to produce a measuring movement of said indicating member in proportion to the amount of displacement of said one device from the position occupied by the device when the mechanism was rendered operative; means associated with said translating device for adjusting it into reproducing and other conditions; and means, associated with said adjusting means and actuated in the conditioning of said translating device for reproducing, for placing said mechanism out of operation.

17. In a phonograph including a record-supporting device and a record-cooperating translating device, one of said devices being advanceable and backspaceable along the other: the combination of means for measuring the displacement of said one device from any position in its path, comprising an indicating member mounted for indicating movement independent of the travelling movement of said one device, and a unitary drive transmission for said member placeable into operative condition, at will, to cause said member to receive an indicating movement in either direction in accordance with the amount and direction of displacement of said one device from the position occupied by the device when the drive transmission is rendered operative; means to releasably hold said transmission in operative condition; and means, actuated by said indicating member in response to a predetermined measuring movement thereof, for releasing said holding means.

18. In a phonograph including a record-supporting device and a record-cooperating translating device, one of said devices being advanceable and backspaceable along the other: the combination of means for measuring the displacement of said one device from any position in its path, comprising an indicating member mounted for indicating movement independent of the travelling movement of said one device, and a unitary drive transmission for said member placeable into operative condition, at will, to cause said member to receive an indicating movement in either direction in accordance with the amount and direction of displacement of said one device from the position occupied by the device when the drive transmission is rendered operative; means to releasably hold said transmission in operative condition; means associated with said translating device to adjust it into recording and other conditions; and means to release said holding means upon conditioning said translating device for recording by said adjusting means.

19. In a phonograph including a record-supporting device and a translating device including means to condition it for recording and reproducing, one of said devices being advanceable and backspaceable along the other: the combination of a movable indicating member normally held stationary at a neutral position in the path of its indicating movement during normal progressive operations of the phonograph; a unitary drive transmission placeable into operative condition at any position of said one device to cause said member to receive an indicating movement out of said neutral position in either direction in accordance with the amount and direction of displacement of said one device from the position occupied by the device when the mechanism is put in operation; means operable to condition said translating device for reproducing and concurrently place said mechanism in operation; and means, influenced by said indicating member in the movement thereof in advance of said neutral position, for conditioning said device for recording and concurrently placing said transmission out of operation.

20. In a phonograph including a record-supporting device and a translating device, one of said devices being advanceable and backspaceable along the other: the combination of means for measuring the displacement of said one device from any position in its path, placeable into operative condition at any one position of said one device; a control member operatively connected with said measuring means and movable from a released position to a constrained position to place the measuring means in operation; and means associated with said control member and effective when said measuring means is in operation to prevent the full return of said control member to released position.

21. In a phonograph including a record-supporting device and a translating device, one of said devices being manually advanceable and backspaceable along the other: the combination of a movable member; means operative during normal progressive operations of the phonograph for holding said member stationary at a neutral position in the path of its significant movement; means operable at any position of said one device to connect the device with said movable member whereby to cause the latter to be moved in proportion to the distance of displacement of said one device from the position occupied by the device when the connecting means was rendered operative; and stop means effective on said movable member to limit the displacement of said one device.

22. In a phonograph including a record-supporting device and a translating device, one of said devices being advanceable and backspaceable along the other: the combination of means for measuring the displacement of said one device from any position in its path, comprising a movable indicating member, means operative during normal progressive operations of the phonograph for holding said member stationary at a neutral position in the path of its indicating movement and means operable at any position of said one device to connect the same with said indicating member whereby to cause the latter to be moved in proportion to the movement of the former; and means, associated with said indicating member, for limiting the distance of displacement of said one device.

23. In a phonograph including a record-supporting device and a record-cooperating translating device, one of said devices being mounted for travelling movement, and drive means for said one device: the combination of a movable member normally held stationary in its path of significant movement; coupling means for drivingly connecting said movable member with said one device; means to releasably hold said coupling means in operative position; a releasable drive connection between said drive means and said one device; a control member operable to move said coupling means into operative position and place the same under the influence of said holding means and concurrently to release said drive connection to free said one device for manual movement; a movement-limiting means for said movable member adapted to restrict the distance of manual movement of said one device from the position occupied by the device when said control member is operated to a predetermined value; and means, operated by said one device in the completion of the manual movement of the same through said predetermined distance, for releasing said holding means.

24. In a phonograph including a rotatable record-supporting device and a translating device, one of said devices being advanceable and backspaceable along the other, and a drive for moving said one device and rotating said record-supporting device: the combination of means for measuring the displacement of said device from any position in its path, comprising a movable indicating member, means normally holding said indicating member stationary in its path of indicating movement, and a mechanism having operative and inoperative conditions and adapted when in operative condition to cause the indicating member to be moved in proportion to the amount of displacement of said one device from the position occupied by the device when the mechanism was rendered operative; a start-stop means operable to render said drive effective and ineffective; and an operative connection between said start-stop means and said mechanism for causing the former to be actuated into stop position concurrently upon restoring the latter to inoperative condition.

25. In a phonograph including a rotatable record-supporting device and a translating device, one of said devices being advanceable and backspaceable along the other, and a drive for moving said one device and rotating said record-supporting device: the combination of means for measuring the displacement of said one device from any position in its path, comprising a movable indicating member, means normally holding said indicating member stationary in its path of indicating movement, and a mechanism having operative and inoperative conditions and adapted when in operative condition to cause the indicating member to be moved in proportion to the amount of displacement of said one device from the position occupied by the device when the mechanism is rendered operative; a start-stop means operable to render said drive effective and ineffective; and means, controlled by said indicating member in the advance movement thereof, for placing said start-stop means into stop position and concurrently rendering said mechanism inoperative.

26. In a phonograph including a rotatable record-supporting device and a translating device, one of said devices being advanceable and backspaceable along the other, and a drive for moving said one device and rotating said record-supporting device: the combination of means for measuring the displacement of said one device from any position in its path, comprising a movable indicating member, means normally holding said indicating member stationary at a neutral position in its path of indicating movement, and a mechanism having operative and inoperative conditions and adapted when in operative condition to cause the indicating member to be moved in proportion to the amount of displacement of said one device from the position occupied by the device when the mechanism is rendered operative; means associated with said drive and effective to stop the same; and means, controlled by said indicating member in the advance movement of the same beyond said neutral position, for actuating said stop means and concurrently restoring the indicating member to neutral position.

27. In a phonograph including a record-supporting device and a record-translating device, one of said devices being advanceable and backspaceable along the other, and a drive for advancing said one device: the combination of a movable member for indicating the displacement of said one device from any position in its path; a drive mechanism for said indicating member adapted to move the same in accordance with the movements of said one device and including a control member operable to place the mechanism into operative and inoperative conditions at will; a stop control for said drive normally held in run position; means actuated by said control member in rendering said mechanism operative for releasably coupling the control member with said stop control; means for restoring said mechanism to inoperative condition and concurrently moving said stop control to stop position; means to condition said device for recording and reproducing; and means, controlled by said conditioning means, for releasing said coupling means.

28. In a phonograph including a record-supporting and a record-translating device, one of said devices being advanceable and backspaceable along the other, and a drive for advancing said one device: the combination of a movable indicating member; a drive mechanism for said indicating member adapted to move the same in accordance with the movements of said one device, and including a control member operable to place the mechanism into operative and inoperative conditions; a stop means for said drive normally held in run position and including a movable control member; means, actuated by said first control member in the movement thereof to render said mechanism operative, for releasably coupling said first control member to said second control member; means, controlled by said indicating member in the driven movement thereof, for restoring said mechanism to inoperative condition and concurrently operating said stop means to stop position; means associated with said translating device to condition it for recording and reproducing; and means, actuated by said conditioning means, for releasing said coupling means.

29. In a phonograph including a record-supporting and a record-translating device, one of said devices being advanceable and backspaceable along the other, and a drive for advancing said one device: the combination of a movable indicating member, a drive mechanism for said indicating member adapted to move the same in accordance with the movements of said one device and including a clutch member movable into engaged and disengaged positions to place the drive mechanism into and out of operation; means to condition said translating device for recording and reproducing, placed into reproducing position upon moving said clutch member to engaged position; a stop means for said drive, normally held in run position; a start-stop control effective on said drive when said stop means occupies run position; a releasable coupling between said clutch member and said stop means, rendered effective upon moving said clutch member to engaged position; means, controlled by said indicating member, for disengaging said clutch member and concurrently moving said stop means to stop position; and means, controlled by said start-stop control in the ensuing movement thereof to stop position, for actuating said conditioning means into recording position and concurrently releasing said coupling.

30. In a phonograph including a record-supporting device and a record-cooperating translating device, one of said devices being advanceable and backspaceable along the other, and drive means for said one device: the combination of means for measuring the displacement of said one device from any position in its path including means operable at any one position of said one device to place the measuring means in operation; means to couple said drive means with said one device; means associated with said translating device to adjust it into operative and inoperative conditions; a unitary control means for and operatively connected to each said measuring, coupling and adjusting means; and manually operable means, associated with said unitary control means, for disconnecting the latter from said measuring means.

31. In a phonograph including a record-supporting device and a record-cooperating translating device, one of said devices being advanceable and backspaceable along the other, and drive means for said one device: the combination of means for measuring the displacement of said one device from any position in its path including means operable at any one position of said one device to place the measuring means in operation; means to couple said drive means with said one device; means associated with said translating device for adjusting it into respective operative conditions for recording and reproducing; a common control means for said measuring, coupling and adjusting means; and a separate control means operable to shift said translating device between its respective operative conditions and concurrently to render said common control means ineffective as to said measuring means.

32. In a phonograph including a record-supporting device and a translating device having recording and reproducing conditions, one of said devices being advanceable and backspaceable along the other: the combination of means for measuring the displacement of said one device from any position in its path including means operable at any position of said one device to place the measuring means in operation; a first control means, operatively connected with said translating device and measuring means, for conditioning said translating device for reproducing and concurrently placing said measuring means in operation; and a second control means selectively operable either to condition said translating device for recording and concurrently place said measuring means out of operation, or to condition said translating device for reproducing and concurrently render said first control means ineffective as to said measuring means.

33. In a phonograph including a record-supporting device and a translating device, one of said devices being advanceable and backspaceable along the other, and drive means operatively connectable with said one device to move the same: the combination of means for measuring the displacement of said one device from any position in its path including means operable at will to place the measuring means in operation; means associated with said translating device to adjust it into operative and inoperative conditions; and a control member effective upon a single manipulation thereof to disconnect said drive means from said one device and to place said translating device into inoperative condition and said measuring means out of operation.

34. In a phonograph including a record-supporting device and a translating device including means to adjust it into operative and inoperative conditions, one of said devices being advanceable and backspaceable along the other, and drive means connectable with said one device to advance the same: the combination of means for measuring the displacement of said one device from any position in its path including means operable at will to place the measuring means in operation; control means movable from a resiliently biased position to a manually constrained position to disconnect said one device from said drive means and concurrently place said translating device into inoperative condition and said measuring means in operation; and means effective upon the release of said control means from said constrained position to maintain said measuring means in operation and to return said translating device to operative condition and to reconnect said one device with said drive means.

35. In a phonograph including a record-supporting device and a translating device including means to adjust it into operative and inoperative conditions, one of said devices being advanceable and backspaceable along the other, and drive means for said one device: the combination of means for measuring the displacement of said one device from any position in its path including means operable at any one position of said one device to place said measuring means in operation; and control means operatively associated with said adjusting, drive and measuring means and including a common control member movable into one operative position to disconnect said driving means from said one device and to place said translating device into inoperative condition and said measuring means in operation, and movable into a second operative position only to disconnect said driving means from said one device and to place said translating device into inoperative condition.

36. The subject matter as set forth in claim 34, including means associated with said control means and rendered effective when said control means is moved beyond said constrained position to render said measuring means inoperative and to retain said translating device in inoperative condition and said drive means disconnected from said one device.

GEORGE H. FRITZINGER.